US012786261B2

(12) United States Patent
Lin et al.

(10) Patent No.: US 12,786,261 B2
(45) Date of Patent: Nov. 3, 2026

(54) METHOD OF NOTIFYING NODES OF A DETECTED EVENT DURING A CONFERENCE CALL

(71) Applicant: DELL PRODUCTS L.P., Round Rock, TX (US)

(72) Inventors: Yung-Sheng Lin, Taoyuan City (TW); Shun-Tang Hsu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 19/031,485

(22) Filed: Jan. 18, 2025

(65) Prior Publication Data

US 2026/0214135 A1 Jul. 23, 2026

(51) Int. Cl.
*H04L 65/80* (2022.01)
*H04L 65/403* (2022.01)

(52) U.S. Cl.
CPC ............ *H04L 65/80* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 9,772,838 B2 | 9/2017 | Cavalaris et al. | |
| 10,867,610 B2 * | 12/2020 | Diamant | H04N 7/15 |
| 11,451,407 B1 | 9/2022 | Iyer et al. | |
| 2024/0129149 A1 * | 4/2024 | Pious | G06F 3/04817 |
| 2024/0205277 A1 * | 6/2024 | Sano | H04L 67/535 |
| 2025/0055901 A1 * | 2/2025 | Singh | H04L 65/60 |
| 2025/0150296 A1 * | 5/2025 | Raghavulu | G06F 3/165 |
| 2025/0301031 A1 * | 9/2025 | Kang | H04L 65/403 |
| 2026/0031097 A1 * | 1/2026 | Chen | G10L 25/60 |
| 2026/0095366 A1 * | 4/2026 | Berriel | H04L 41/0631 |

* cited by examiner

*Primary Examiner* — Jeffrey R Swearingen
(74) *Attorney, Agent, or Firm* — Larson Newman, LLP

(57) ABSTRACT

An information handling system may include a media platform that can be configured to monitor the delivery of a multimedia (e.g., audio signal) at receiving nodes and notify a transmitting node of a detected event (e.g., inaudible audio) for prompt corrective action. In an embodiment, the media platform may receive at least one sensor data that is associated with a receiving of a multimedia; compare the at least one sensor data with a corresponding threshold; detect an event based at least upon the comparison between the at least one sensor data and the corresponding threshold; and in response to a detected event, send a notification to each of the plurality of communicating nodes.

18 Claims, 6 Drawing Sheets

METHOD OF NOTIFYING NODES OF A DETECTED EVENT DURING A CONFERENCE CALL

FIELD OF THE DISCLOSURE

The present disclosure generally relates to distributed systems and, more particularly, to a server that receives sensor data measurements (e.g., audio packet loss) associated with the receiving of multimedia (e.g., audio signal) and notifies a transmitting node of a detected event (e.g., poor audio quality) that may require a user action.

BACKGROUND

As the value and use of information continue to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use, such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system (or a server) may include a multimedia platform to monitor the delivery of multimedia at receiving nodes and notify a transmitting node of a detected event for prompt corrective action. The multimedia may include audio signals, video signals, image signals (e.g., PowerPoint presentations), or a combination thereof. The detected event may include a condition that can affect the desired delivery of the multimedia at the receiving nodes. For example, the detected event can include audio signal packet loss, video signal packet loss, and/or incomplete image rendering. In an embodiment, during a conference call, the multimedia platform may receive data streams of sensor data (measurements) associated with the delivery of the multimedia at the receiving nodes. The multimedia platform may include an event detector module that utilizes threshold values of corresponding sensor data measurements, metadata of the sensor data, and/or machine learning algorithms to detect the event at one or more receiving nodes. A server notification module may then communicate the detected event to the transmitting node for corrective action. For example, a speaker in a conference call may be notified that there is no audio signal (detected event) being heard by the targeted nodes, which can be identified from the metadata of the sensor data associated with the receiving of the audio signal (multimedia). In this example, the speaker is notified in real time of the detected event.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
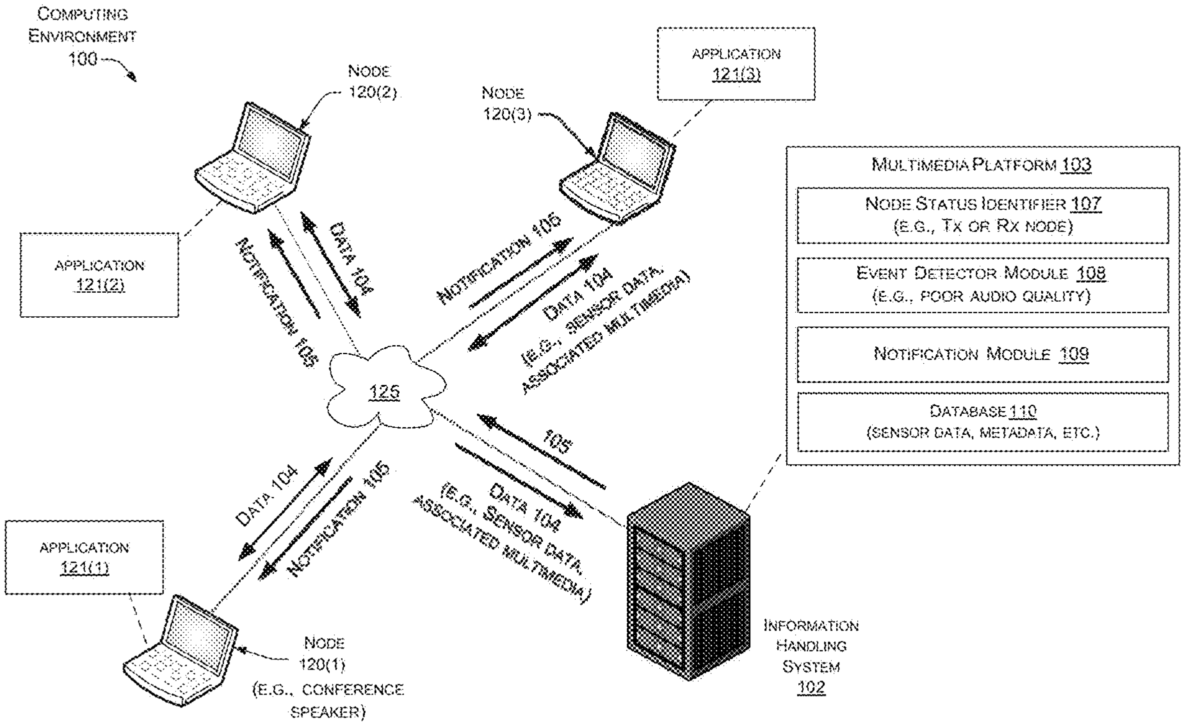
FIG. 1 is a block diagram of an example computing environment including a server that receives data streams of sensor data measurements from receiving nodes according to at least one embodiment of the present disclosure.

FIG. 1 illustrates an example computing environment 100, according to at least one embodiment of the present disclosure. The computing environment 100 may refer to a collection of hardware, software, and networks that interact to perform and manage computational tasks. In some embodiments, the computing environment 100 includes an information handling system 102 that utilizes a multimedia platform 103 to process data streams (data 104) of sensor data measurements from communicating nodes 120(1), 120(2), and 120(3). The sensor data measurements (data 104) may include captured node parameters associated with the receiving of the multimedia by the receiving nodes. The data 104 may also include metadata (not shown) such as a source node ID, a destination node ID, content type (e.g., type of multimedia), session identifiers, timestamp, etc. The information handling system 102 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes.

For example, a particular information handling system 102 may represent a computer system, such as a laptop computer, a desktop computer, a computer workstation, a server system, a blade server system, or other rack-mounted computer equipment, such as a storage server, a network server, a network switch/router, or other datacenter computer equipment, or other electronic equipment generally defined, but being characterized as including the multimedia platform 103 for processing the data 104 (e.g., sensor data measurements), detecting an event based on the one or more sensor data measurements associated with the receiving of the multimedia by the receiving nodes, and sending a notification 105 of the detected event to the transmitting node and/or receiving nodes. The notification 105 to the transmitting node, for example, improves communication efficiency by alerting the speaker (or transmitting node) of the detected event that is associated with the receiving of the multimedia at the receiving nodes. The multimedia may include an audio signal, video signal, and/or image signal.

In an embodiment, the multimedia platform 103 may include an application that utilizes metadata (not shown) of the sensor data measurements (data 104) to identify the transmitting and receiving nodes. For example, the sensor data is associated with the receiving of a particular multimedia. Here, the metadata of the sensor data (data 104) may include device IDs of transmitting nodes and targeted nodes, type of multimedia, session identifiers, etc. In this example, the multimedia platform 103 may identify from the metadata of the data 104 the transmitting node and the targeted nodes.

The multimedia platform 103 may also use threshold values and/or algorithms to detect the event that can affect the desired delivery of the multimedia at the receiving nodes. For example, the node 120(1) is transmitting an audio signal (type of multimedia) to the node 120(3) during a conference. Here, the multimedia platform 103 may receive from the receiving node 120(3) one or more sensor data measurements (data 104) such as a measured signal-to-noise (SNR) which may indicate inaudibility of the audio signal (multimedia) due to high background noise. The multimedia platform 103 may use SNR threshold values corresponding to the sensor data to determine the event that can trigger notification of the transmitting node. In an embodiment, the notification 105 may be sent to participating nodes only, such as identified transmitting and receiving nodes.

In an embodiment, the multimedia platform 103 may include a node status identifier 107, an event detector module 108, a notification module 109, and database 110. Each of the communicating nodes 120(1), 120(2), and 120(3) may include applications 121(1), 121(2), and 121(3), respectively, that can facilitate the capturing and transmitting of the captured sensor data measurements (data 104) to the server. The applications 121(1), 121(2), and 121(3) may use sensor devices (not shown) in corresponding nodes 120(1), 120(2), and 120(3) to capture the sensor data measurements that are associated with the receiving of the multimedia at the targeted or receiving nodes. Each of the applications 121(1), 121(2), and 121(3) may perform the function of the server multimedia platform 103 as described herein. In general, the information handling system 102 utilizes the received data 104 to identify the transmitting and receiving nodes, detect the event in one or more receiving nodes, and notify the nodes of the detected event for corrective user action.

Node status identifier 107 may be configured to identify and distinguish the transmitting node from the receiving node based on metadata (not shown) associated with the data 104. For example, and depending upon the protocol used for communication, the metadata of the data 104 may include device IDs of the transmitting node and recipient nodes, file type or format such as MP4 or JPEG of the associated multimedia, timestamp of transmission and reception of the multimedia, and the like. The transmitting node may be distinguished from the receiving node to identify the node that is to be notified in response to the detection of the event that is associated with the delivery of the multimedia.

For example, the node 120(1) is used by the conference speaker in a conference call between the node 120(1) and the participating nodes 120(2) and 120(3). The node 120(1) transmits multimedia that is to be received by the receiving nodes 120(2) and 120(3). In this example, the applications 121(2) and 121(3) of the respective participating nodes 120(2) and 120(3) may facilitate the capturing and sending of captured sensor data measurements (data 104) that are associated with the receiving of the multimedia at the receiving nodes 120(2) and 120(3). The node status identifier 107 may use the metadata (e.g., device IDs) in the sensor data measurements (data 104) to identify the node 120(1) to be the transmitting node and the nodes 120(2) and 120(3) as the receiving nodes. In case of a detected event, the notification module 109 may send the notification 105 to the transmitting node 120(1), for example.

In some embodiments, the node identifier 107 may use audio-to-text translations of the participants to identify the conference speaker. For example, the words or phrases "I will be discussing," "I will be going over," and the like, which may be indicative of the conference speaker and thus, a transmitting node. The respective applications 121 of the communicating nodes 120 may capture these words or phrases and transmit the captured words or phrases as sensor data measurements (data 104) to the information handling system 102 for further processing.

Following the example above, the event detector module 108 may include hardware and software to detect an event that may affect the desired delivery of the multimedia (data 104) at the receiving nodes 120(2) and 120(3). The data 104 may include the sensor data and/or audio-to-text translations from the participants. Here, the event detector module 108 may use preconfigured thresholds (not shown) corresponding to the type of sensor data measurements to detect the event. Different preconfigured thresholds may be used for measured audio signal parameters, video signal parameters, or image signal parameters at the receiving nodes. In some embodiments, the event detector module 108 may process the user or participant interactions or communication network features to detect the event as described herein.

For measured audio signal parameters (sensor data), the event detector module 108 may use corresponding preconfigured thresholds (not shown) for the measured audio signal parameters at the receiving nodes 120(2) and 120(3). For example, a Signal-to-Noise Ratio (SNR) threshold may be used to measure the clarity of the received audio signal relative to the background noise. In another example, a volume level threshold may be used to determine whether the audio signal at the receiving node is too low or even muted. In another example, an audio latency threshold may be used to determine the delay in the delivery of the audio signal to the targeted nodes. In these examples, the event detector module 108 may utilize these corresponding thresholds to detect the event that can affect the delivery of the audio signal at the receiving nodes 120(2) and 120(3). The detected event may be relayed to the transmitting node 120(1) for corrective action.

For measured video signal parameters (sensor data), the event detector module 108 may use corresponding preconfigured thresholds (not shown) for measured video signal parameters at the receiving nodes 120(2) and 120(3). For example, a frame rate threshold may be used to identify low frame rates that can indicate interruptions or transmission issues in the delivery of the video signal. In another example, a packet loss rate threshold may be used to determine whether the amount of missing video packets during transmission affects the viewing of the video at the targeted nodes. In these examples, the event detector module 108 may utilize these corresponding thresholds for these measured video signal parameters to detect the event that can affect the delivery of the video signal at the receiving nodes 120(2) and 120(3). The detected event may be similarly relayed to the transmitting node 120(1) for corrective action.

For measured image signal parameters, the event detector module 108 may use the preconfigured thresholds (not shown) for the measured image signal parameters at the receiving nodes 120(2) and 120(3). For example, an image latency threshold may be used to track the delay in the displaying of the images at the receiving nodes 120(2) and 120(3). In another example, an image distortion threshold may be used to identify incomplete rendering of the image at the receiving nodes. In another example, a packet loss rate threshold may be used to detect missing image data during transmission. In these examples, the event detector module 108 may utilize these corresponding thresholds to detect the event that can affect the delivery of the image signal at the receiving nodes 120(2) and 120(3). The detected event may be similarly relayed to the transmitting node 120(1) for corrective action.

In an embodiment, the event detector module 108 may use Natural Language Processing (NLP) on detected user feedback at the receiving nodes 120(2) and 120(3) to detect the event. Here, the event detector module 108 or the node applications 121 may capture the user feedback. For example, the participant/user feedback or the audio-to-text translations captured during the conference call include "I can't hear," "I can't see," "video is frozen," and the like, may be indicative of the interrupted delivery of the multimedia at the targeted node. In another example, the detection of audio-to-text translations, "hello . . . hello . . . " and the toggling of the audio volume may be indicative of the lack of audio signal at the receiving node. In these examples, the event detector module 108 may use preconfigured thresholds and/or algorithms (e.g., event detector model) to determine the likely occurrence of the event that can affect the delivery of the multimedia at the receiving node.

Notification module 109 may include a component that is configured to send real-time alerts to participating nodes 120(1)-120(3) in response to the detected event. As described above, the sensor data measurements (data 104) may include the metadata to identify the transmitting and receiving nodes. The metadata may include the device IDs of the transmitting and receiving nodes, for example. Here, and in response to the detected event, the notification module 109 is responsible for communicating the detected event to the participating nodes for prompt corrective action. For example, the transmitting node may be alerted of the failure to receive the multimedia at the receiving nodes.

Database 110 may store information that supports operations of the multimedia platform 103. For example, the database 110 may store the data 104, preconfigured thresholds for detecting events, historical data, and similar information. The database 120 may also support the generation of an event detector model (not shown) that can be used to detect a likelihood of occurrence of the events at the receiving nodes. For example, the event detector model may use user feedback-based model and/or a sensor data-based model to detect the likely occurrence of the event at one or more receiving nodes. The user feedback-based model may be trained on captured chat messages or audio-to-text translations, while the sensor data-based model can be trained on captured sensor data to detect the event.

The network 125 may be a local area network (LAN), a wide-area network (WAN), a carrier or cellular network, or a collection of networks that includes the Internet. Network communication protocols (TCP/IP, 4G, 5G, 6G, etc.) may be used to implement portions of the network 125.

In an embodiment, the multimedia platform 103 may receive the sensor data 104 from the identified receiving nodes (e.g., node 120(2) and 120 (3)) and notify (notification 105) a transmitting node (e.g., node 120(1)) of a detected event for prompt corrective action. The data 104 may include sensor data measurements associated with the receiving of the multimedia. The sensor data measurements may also be associated with the captured user or participant feedback that is indicative of the likely occurrence of the event. The detected event can include detected audio packet loss, video packet loss, image packet loss, etc., at the targeted nodes. In some embodiments, each of the applications 121(1)-121(3) may similarly include event detector modules, node status identifiers, and notification modules that are configured to perform the same functions as those described in the information handling system 102.

After collecting the data over time that included the captured audio-to-text translations, participant feedback, and sensor data measurements, the event detector model (not shown) may be generated from the collected data that were stored in the database 110. In an embodiment, the event detector model may include machine learning algorithms to classify an input to determine the likelihood of occurrence of the event. As further described in FIG. 3, the event detector model may include the user feedback-based model and sensor data-based model.

Figure 2:
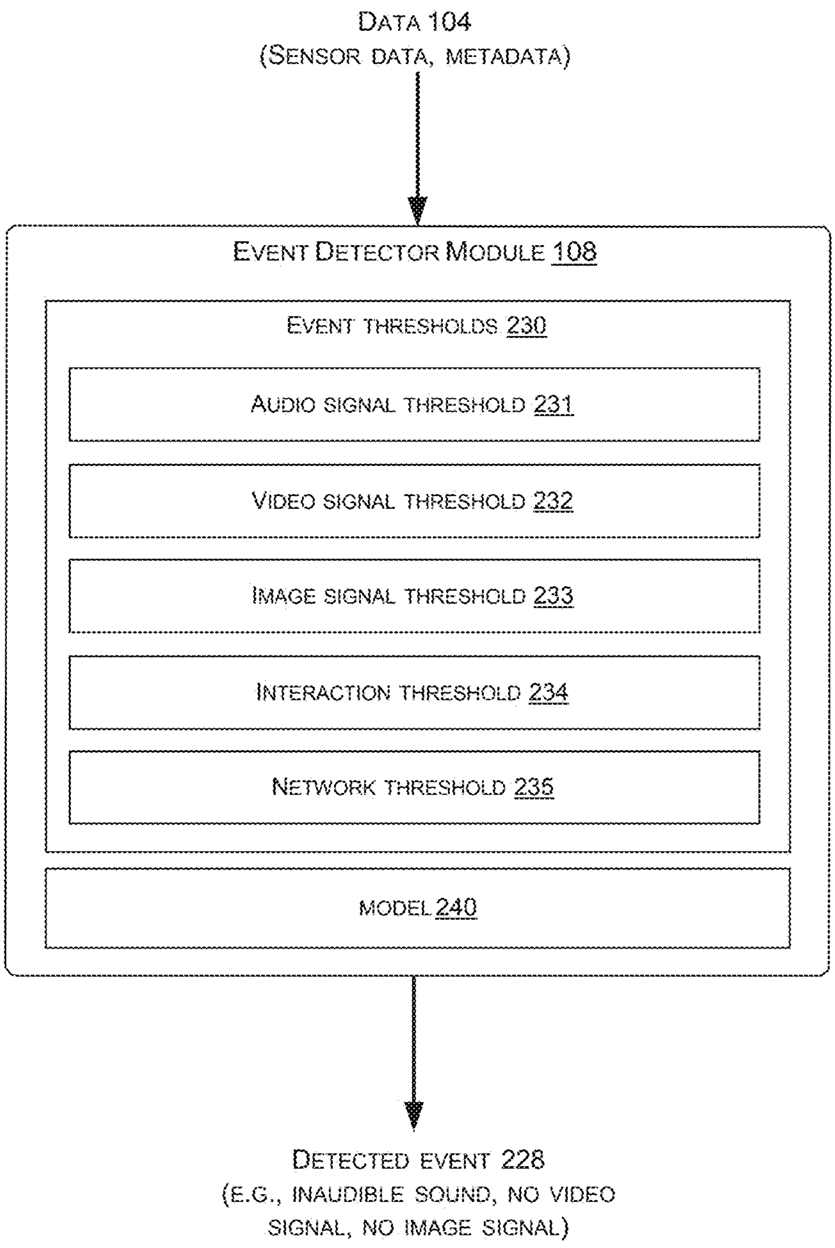
FIG. 2 is a block diagram of an example event detector module to detect an event that is associated with a delivery of multimedia at one or more receiving nodes according to at least one embodiment of the present disclosure.

FIG. 2 is an example block diagram of the event detector module 108 configured to detect an event (detected event 228) that is associated with a delivery of multimedia at one or more receiving nodes according to at least one embodiment of the present disclosure. The event detector module 108 may use preconfigured event thresholds 230, machine learning algorithms (model 240), or a combination thereof to detect the event (detected event 228) that may affect the delivery of the multimedia at the targeted or receiving nodes. The event thresholds 230 may include an audio signal threshold 231, a video signal threshold 232, an image signal threshold 233, an interaction threshold 234, and a network threshold 235.

The audio signal threshold 231 may include threshold values to detect audibility or inaudibility of the audio signals at the receiving node. For example, an SNR of below 20 dB may indicate poor clarity of the audio signal due to high background noise. In this example, if the detected SNR drops below the preconfigured SNR threshold for a defined period (e.g., 3 seconds), the audio signal can be flagged as inaudible (detected event 228). In another example, a speech-to-silence ratio (SSR) of below 0.1 (mostly silence) during active speaking at the transmitting node may indicate muted or dropped audio (detected event 228). In these examples, the audio signal threshold 231 may be used to detect the event (detected event 228) based on the measured audio signal parameters at the receiving nodes.

The video signal threshold 232 may include threshold values to detect the quality of service (QoS) of the video signals at the receiving node. For example, a frame rate of below 15 frames per second for a defined period may indicate a disrupted video signal (detected event 228). In this example, if the detected FPS drops below the preconfigured video signal threshold 232 for a defined period (e.g., 3 seconds), the video signal can be flagged as video signal failure (detected event 228). In another example, a video packet loss rate of more than 5% of the video packets may indicate incomplete frames (detected event 228). In these examples, the video signal threshold 232 may be used to detect the event (detected event 228) based on the measured video signal parameters at the receiving nodes.

The image signal threshold 233 may include threshold values to detect the QoS of the image signals at the receiving node. For example, an image resolution below the preconfigured threshold may indicate poor delivery quality (detected event 228) of the image signal. In another example, an image packet loss rate of more than 5% of the image packets may indicate incomplete image rendering (detected event 228). In these examples, the image signal threshold 233 may be used to detect the event (detected event 228) based on the measured image signal parameters at the receiving nodes.

The interaction threshold 234 may include threshold values to detect QoS based on captured user feedback or interactions at the receiving nodes. The interaction threshold 234 may be used to detect the event based on participant behavior or feedback patterns. For example, detected audio-to-text feedback words or phrases, "I can't hear you," "no sound," or "you're breaking up" may trigger the detection of the event (detected event 228) at the receiving node. In this example, these words or phrases may indicate a lack of sound at the receiving nodes. The interaction threshold 234 may include the number of times that these words or phrases are captured during the reception of the multimedia to indicate the likely presence of the event.

The network threshold 235 may include threshold values to detect the QoS of the communication medium or channel. For example, a packet loss rate of more than 5% may indicate degraded audio signals due to noise in the communication channel. In this example, the network threshold 235 may be used to detect the event based on the detected measurements at the communication channel rather than the measured node parameters.

Model 240 may utilize one or more input features to detect the event (detected event 228). For example, a first input feature may include sensor data measurements, while a second input feature can involve activity of the users (e.g., user feedback). The second input feature may include detection of chat messages containing keywords like "no audio," "sound," or "mute" that may indicate the likely occurrence of the event at the receiving nodes. The output (detected event 228) of the model 240 may indicate presence of the event that may require prompt correction or action from the transmitting node. The model 240 is described in further detail below.

Figure 3:
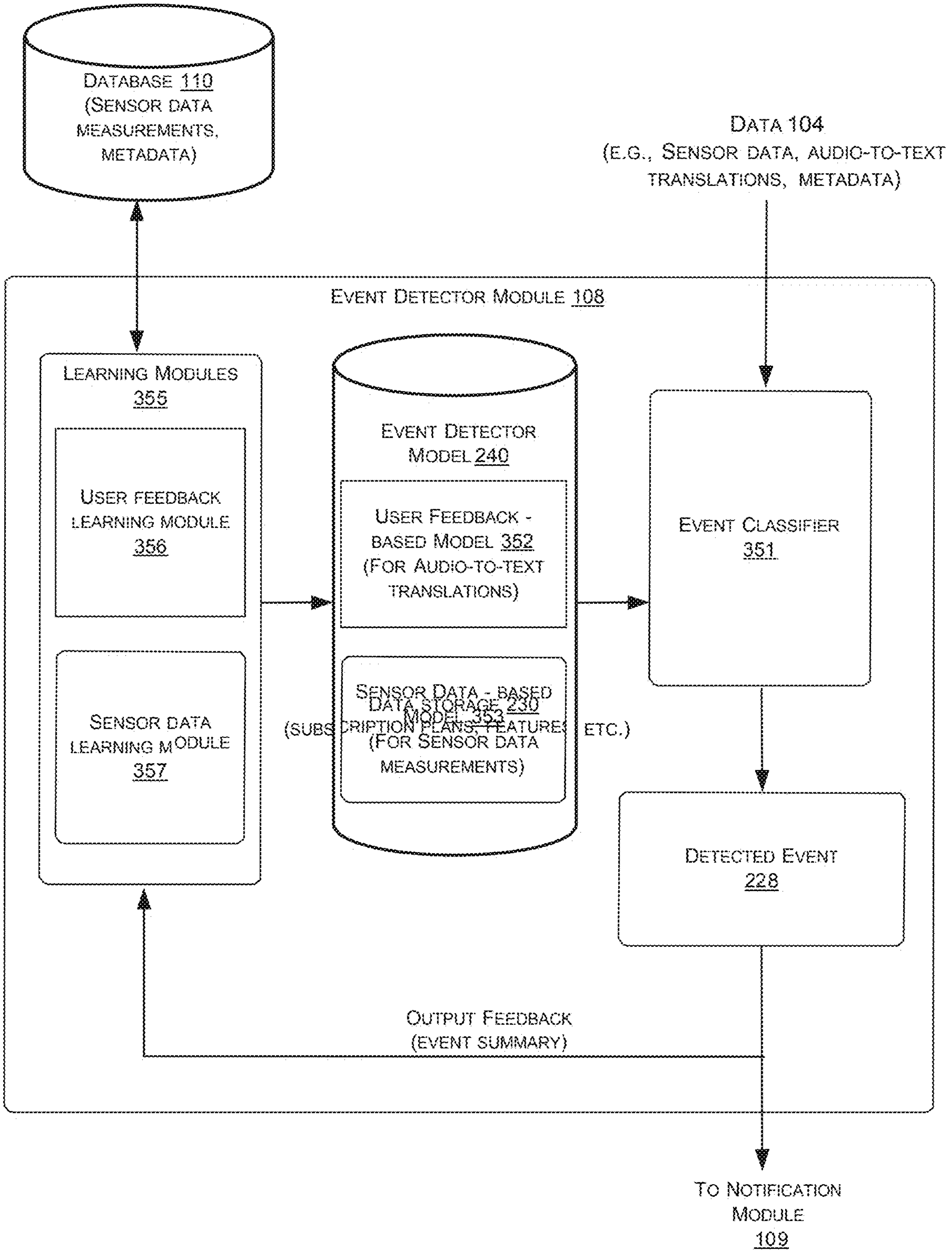
FIG. 3 is a block diagram of an example event detector module to detect an event that is associated with a delivery of multimedia at one or more receiving nodes according to at least one embodiment of the present disclosure.

FIG. 3 is an example block diagram of the event detector module 108 configured to detect an event (detected event 228) that is associated with a delivery of multimedia at one or more receiving nodes according to at least one embodiment of the present disclosure. In one example, the event detector module 108 may algorithmically identify likelihood of occurrence of the events at the receiving nodes using the event detector model 240. The event detector model 240 may be derived from collected data of captured audio-to-text translations, SNR measurements, timestamps of delivery of the multimedia, metadata of transmitted multimedia, and other stored sensor data measurements in the database 110. The event detector model (or model 240) may include machine learning models to algorithmically classify input data measurements (data 104) and determine the likelihood of occurrence of the detected event 228.

As shown, the event detector module 108 may receive an input data 104 that can include audio-to-text translations, volume level, measured SNR, packet loss rate, and/or one or more data measurements captured by the respective application 121 of the communicating nodes 120 as shown above in FIG. 1. The event detector module 108 may then use an event classifier 351 to classify or label the input data 104 by training the model 240 to the input data 104. The model 240 may include a user feedback-based model 352 and a sensor data-based model 353 that can be trained on corresponding input features to classify or categorize the data 104. The user feedback-based model 352 may be trained on captured chat messages or audio-to-text translations, while the sensor data-based model 353 can be trained on captured sensor data to detect the event. After classifying or categorizing the data 104, the detected event 228 may be forwarded to the notification module 109. Summary or details of the detected event 228 may be fed back to learning modules 355.

In an embodiment, the event detector module 108 may include the learning modules 355 that can use historical data from the database 110, output feedback (event summary) from the event classifier 351, and/or user-entered feedback (not shown) to generate and/or update the model 240. The learning modules 355 may include a user feedback learning module 356 and a sensor data learning module 357 that can be used to generate and/or update the user feedback-based model 352 and sensor data-based model 353, respectively.

In one example, the database 110 may store captured audio-to-text translations, SNRs at the receiving nodes, packet loss rates, incomplete image rendering at certain period, data stream measurements, and other sensor data measurements. Over time, these stored data can be used as training data to generate the model 240. For example, the learning modules 355 may include one or more machine learning algorithms that can be used to generate and/or update the model 240. In this example, an administrator or a user may manually mark events in a manner that is proved to the machine learning algorithm. The machine-learning algorithm then builds correlations between input data (e.g., sensor data measurements and/or user interaction) and output data (e.g., detected events) to generate the model 240.

By way of illustration, if the machine learning algorithm in the learning modules 355 is a deep neural network, then values stored in various layers of the neural network may be adjusted based on the provided inputs and outputs from the training data. The deep neural network, which may be used by the model 240, may be thereafter trained to the data 104 to determine the likelihood of occurrence of the event (detected event 228) as described herein. In some cases, the trained model 240 may output the likelihood that the data 104 corresponds to an event. This likelihood may be represented by a percentage that can be compared to a predetermined threshold (not shown). In one example, a combination of the user feedback-based model 352 and the sensor data-based model 353 may be used by the event classifier 351 to classify or categorize the data 104. The classification may include determining the likelihood of occurrence of the event based upon a combination of features taken from the data 104. The detected event 228 is then forwarded to the notification module 109 for further processing.

In an embodiment, the user feedback-based model 352 may use input features such as, captured audio-to-text translations, chat messages, or other user interactions to classify the data 104. On the other hand, the sensor data-based model 353 may use different input features such as measured SNR, packet loss, or other sensor data measurements to classify the data 104. In some embodiments, the event detector model 240 may combine these models to classify the data 104.

Figure 4:
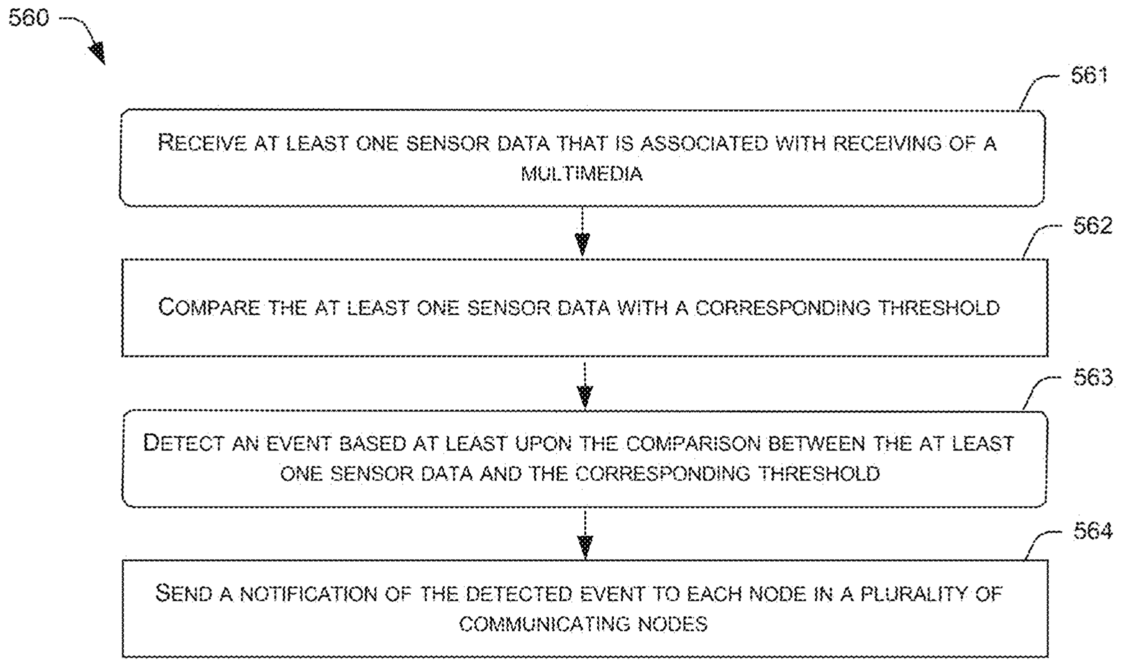
FIG. 4 is a flow diagram of a method for notifying communicating nodes of a detected event according to at least one embodiment of the present disclosure.

FIG. 4 is a flow diagram of a method 460 for notifying the nodes of the detected event according to at least one embodiment of the present disclosure, starting at step 461. It will be readily appreciated that not every method step set forth in this flow diagram is always necessary, and that certain steps of the methods may be combined, performed simultaneously, in a different order, or perhaps omitted, without varying from the scope of the disclosure. FIGS. 1-3 may be employed in whole, or in part, by a controller (multimedia platform 103) of the information handling system 102 of FIG. 1, or any other type of controller, device, module, processor, or any combination thereof, operable to employ all, or portions of, the method of FIG. 4.

At step 461, the multimedia platform 103 (controller) may receive at least one sensor data that is associated with a receiving of the multimedia. For example, the multimedia platform 103 may receive sensor data measurements (data 104) captured by the receiving nodes 120. The receiving nodes 120 may be identified from the metadata forwarded by their corresponding applications 121 to the cloud server (information handling system 102).

At step 462, the multimedia platform 103 may compare the at least one sensor data with a corresponding threshold. For example, the at least one sensor data includes a measured SNR at the receiving nodes. In this example, the multimedia platform 103 may use corresponding SNR threshold for comparison.

At step 463, the multimedia platform 103 may detect an event based at least upon the comparison between the at least one sensor data and the corresponding threshold. In the above example, where the sensor data includes the measured SNR, the corresponding threshold may include the SNR threshold that can indicate the audibility or inaudibility of the received audio signals (multimedia).

At step 464, in response to a detected event, the multimedia platform 103 may send a notification to each of the nodes. For example, the notification 105 may be sent to the transmitting node for prompt corrective action by the user.

Figure 5:
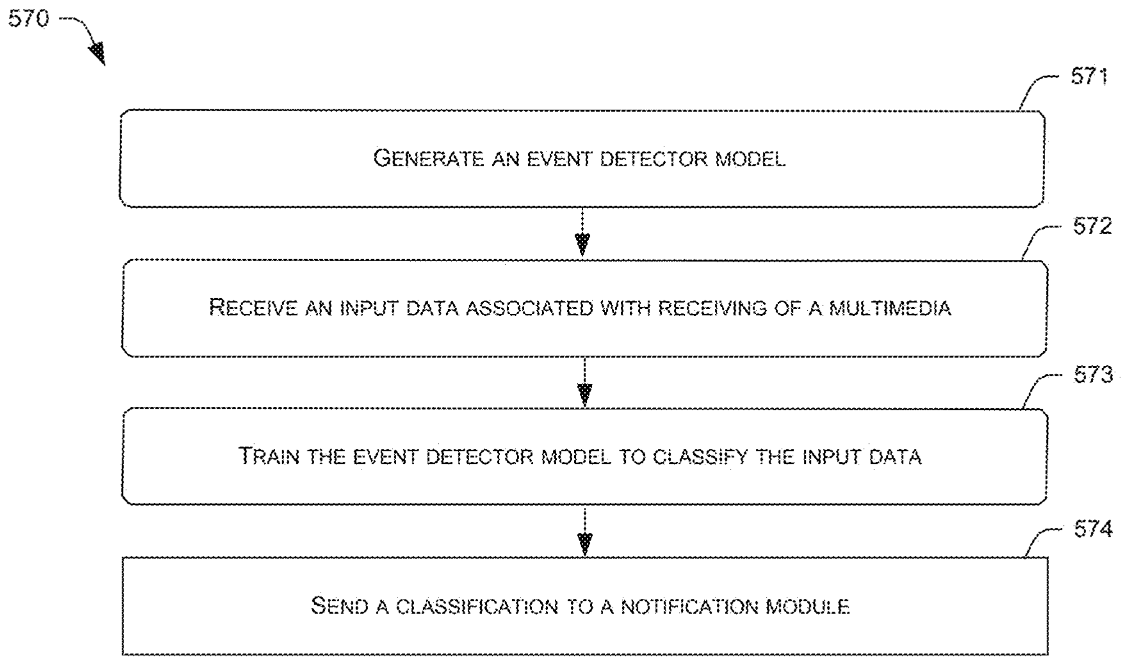
FIG. 5 is a flow diagram of a method for notifying communicating nodes of a detected event according to at least one embodiment of the present disclosure.

FIG. 5 is a flow diagram of a method 570 for notifying the nodes of the detected event according to at least one embodiment of the present disclosure, starting at step 561. It will be readily appreciated that not every method step set forth in this flow diagram is always necessary, and that certain steps of the methods may be combined, performed simultaneously, in a different order, or perhaps omitted, without varying from the scope of the disclosure. FIGS. 1-3 may be employed in whole, or in part, by a controller (multimedia platform 103) of the information handling system 102 of FIG. 1, or any other type of controller, device, module, processor, or any combination thereof, operable to employ all, or portions of, the method of FIG. 5.

At step 571, the multimedia platform 103 (controller) may generate an event detector model 240 from the stored sensor data measurements and captured user feedback or interactions that are associated with the detected events. For example, the event detector module 108 may use learning modules 355 on training data (stored in the database 110) to generate the event detector model 240. In this example, the event detector module 108 may use the event detector model 240 to classify the input data such as the data 104 from one or more receiving nodes.

At step 572, the multimedia platform 103 may receive an input including at least one sensor data and audio-to-text translations of user feedback or interaction. For example, the at least one sensor data includes a measured SNR at the receiving nodes, while the audio-to-text translations include words or phrases such as, "no sound," "no audio," "hello . . . hello . . . " from the users of the receiving nodes.

At step 573, the multimedia platform 103 may train the event detector model 240 to classify the input. For example, the user feedback-based model 352 may be trained on the captured words or phrases from the receiving nodes during the reception of the multimedia. In another example, the sensor data-based model 353 may be trained on the at least one or more sensor data measurements to determine the likelihood of occurrence of the event. In another example, the combination of the user feedback-based model 352 and the sensor data-based model 353 may generate a third model that can be used to determine the likelihood of occurrence of the event. In this case, the third model may combine the features that can be used by the user feedback-based model 352 and the sensor data-based model 353 in determining the likelihood of occurrence of the event At step 564, the multimedia platform 103 may send a classification to the notification module. For example, the classification may include the detected event. Here, the notification module may communicate the notification 105 to the transmitting node for prompt corrective action by the user.

Figure 6:
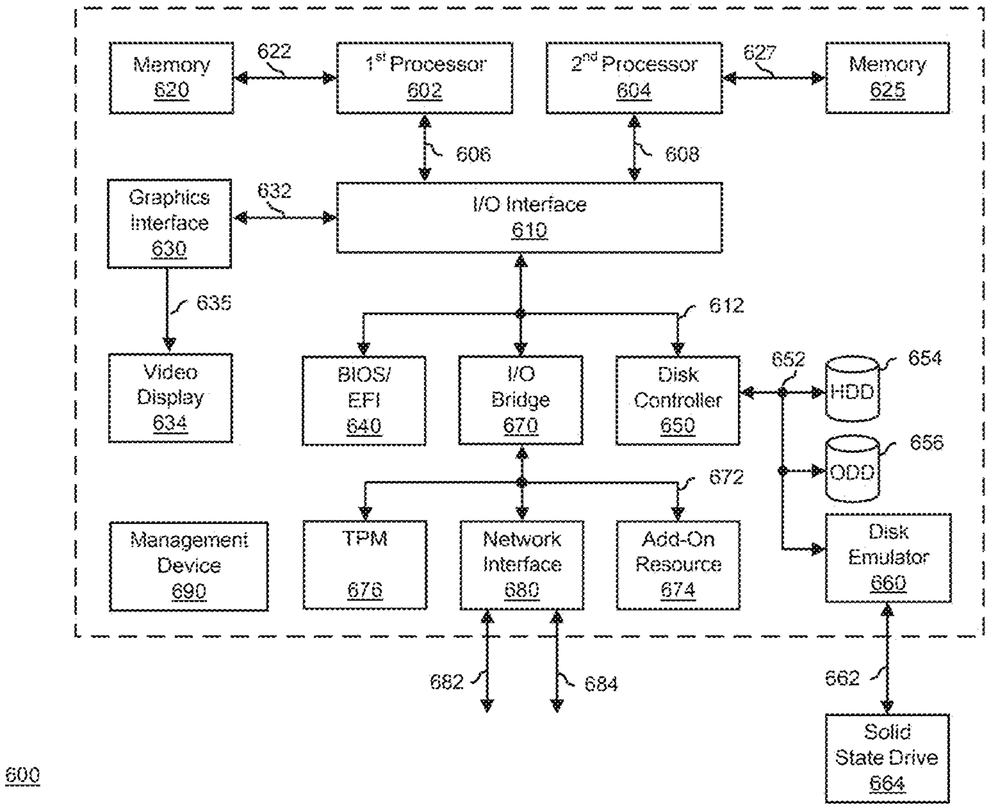
FIG. 6 is a block diagram of a general information handling system according to an embodiment of the present disclosure.

FIG. 6 shows a generalized embodiment of an information handling system 600 according to an embodiment of the present disclosure. Information handling system 600 may be substantially similar to information handling system 102 of FIG. 1 that implements or includes the multimedia platform 103. For the purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operate to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 664, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 664, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 4394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (event detector module), or the like. Management device 690 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
- a plurality of communicating nodes;
- a server coupled to the communicating nodes, the server further comprising:
  - a memory; and
  - a processor coupled to the memory, the processor is configured to:
    - receive at least one sensor data that is associated with a receiving of a multimedia;
    - compare the at least one sensor data with a corresponding threshold;
    - compare captured audio-to-text translations to the corresponding threshold;
    - detect an event based at least upon the comparison between the at least one sensor data and the corresponding threshold and the comparison between the audio-to-text translations and the corresponding threshold; and
    - in response to a detected event, send a notification to at least one of the plurality of communicating nodes.

2. The system of claim 1, wherein the multimedia includes at least one of an audio signal, a video signal, and an image signal.

3. The system of claim 2, wherein the corresponding threshold includes at least one of an audio signal threshold, video signal threshold, or an image signal threshold.

4. The system of claim 1, wherein the processor is further configured to:
- identify from the received sensor data a transmitting node or a receiving node; and
- utilize an event detector model to detect the event at the receiving node.

5. The system of claim 4, wherein at least one input feature of the event detector model includes the audio-to-text translations or the at least one sensor data that is associated with the receiving of the multimedia.

6. The system of claim 1, wherein the at least one sensor data includes a Signal-to-Noise Ratio (SNR) at a receiving node.

7. The system of claim 1, wherein the at least one sensor data includes a video signal packet loss at a receiving node.

8. The system of claim 1, wherein the processor is further configured to:
- detect the event based upon a network threshold, wherein the network threshold includes a packet loss rate threshold during transmission of the multimedia in a communication channel.

9. A method comprising:
- receiving, by a platform, at least one sensor data that is associated with a receiving of the multimedia by a node in a plurality of communicating nodes;
- comparing, by the platform, the at least one sensor data with a corresponding threshold;
- comparing audio-to-text translations of an audio type of signal to the corresponding threshold;
- detecting an event based at least upon the comparison between the at least one sensor data and the corresponding threshold and the comparison between the audio-to-text translations and the corresponding threshold; and
- in response to a detected event, sending a notification to at least one of the plurality of communicating nodes.

10. The method of claim 9, wherein the multimedia includes at least one of an audio signal, a video signal, and an image signal.

11. The method of claim 10, wherein the corresponding threshold includes at least one of an audio signal threshold, video signal threshold, or an image signal threshold.

12. The method of claim 9 further comprising:
- identifying from the received sensor data a transmitting node or a receiving node; and
- utilizing an event detector model to detect the event at the receiving node.

13. The method of claim 12, wherein at least one input feature of the event detector model includes the audio-to-text translations or the at least one sensor data that is associated with the receiving of the multimedia.

14. The method of claim 9, wherein the at least one sensor data includes a Signal-to-Noise Ratio (SNR) at a receiving node.

15. The method of claim 9, wherein the at least one sensor data includes a video signal packet loss at a receiving node.

16. An information handling system comprising:
- a memory; and
- a processor coupled to the memory, the processor is configured to:
  - receive at least one sensor data that is associated with a receiving of a multimedia;
  - compare the at least one sensor data with a corresponding threshold; and
  - compare captured audio-to-text translations to the corresponding threshold;
  - detect an event based at least upon the comparison between the at least one sensor data and the corresponding threshold and the comparison between the audio-to-text translations and the corresponding threshold; and
  - in response to a detected event, send a notification to at least one of a plurality of communicating nodes.

17. The information handling system of claim 16, wherein the processor is further configured to:

identify from the received sensor data a transmitting node or a receiving node; and utilize an event detector model to detect the event at the receiving node.

18. The information handling system of claim 17, wherein at least one feature of the event detector model includes the audio-to-text translations or at least one sensor data that is associated with the receiving of the multimedia.

* * * * *